United States Patent [19]

Mauro

[11] Patent Number: 5,290,493
[45] Date of Patent: Mar. 1, 1994

[54] PROCESS FOR CONTINUOUSLY RECYCLING WATER SOLUABLE RESIN

[75] Inventor: James J. Mauro, Chatham, N.J.

[73] Assignee: Han Yang Chemical Corporation, Seoul, Rep. of Korea

[21] Appl. No.: 960,914

[22] Filed: Oct. 14, 1992

Related U.S. Application Data

[63] Continuation-in-part of Ser. No. 654,811, Feb. 13, 1991, abandoned.

[51] Int. Cl.$^5$ .............................................. B29C 33/76
[52] U.S. Cl. ...................................... 264/37; 264/317
[58] Field of Search ................ 264/37, 142, 221, 317, 264/102; 164/132, 522

[56] References Cited

U.S. PATENT DOCUMENTS 4,108,931 8/1978 Ogden .................................... 264/37

OTHER PUBLICATIONS

Belland AG, Konigshof, "Dispersible Plastics: A New Route to Lost-Core Techniques," *Modern Plastics International*, Nov. 1989, pp. 7–8.

Primary Examiner—Jay H. Woo
Assistant Examiner—Robert B. Davis
Attorney, Agent, or Firm—Majestic, Parsons, Siebert & Hsue

[57] ABSTRACT

The present invention relates to a process for continuously recycling water soluble resin whereby a resin solution including about 6–12 percent by weight of resin is sprayed onto a core made of the resin. The resin used for the solution and core is selected from polyacrylic acid, copolymers of acrylic acid and acrylamide, copolymers of acrylic acid salt and ethyl acrylate, copolymers of acrylamide and acrylic acid, polymethacrylic acid, and copolymers of vinyl alcohol and vinyl acetate. The spraying of the resin solution dissolves the core to form a polymer suspension from which resin is recovered for reuse.

9 Claims, 3 Drawing Sheets

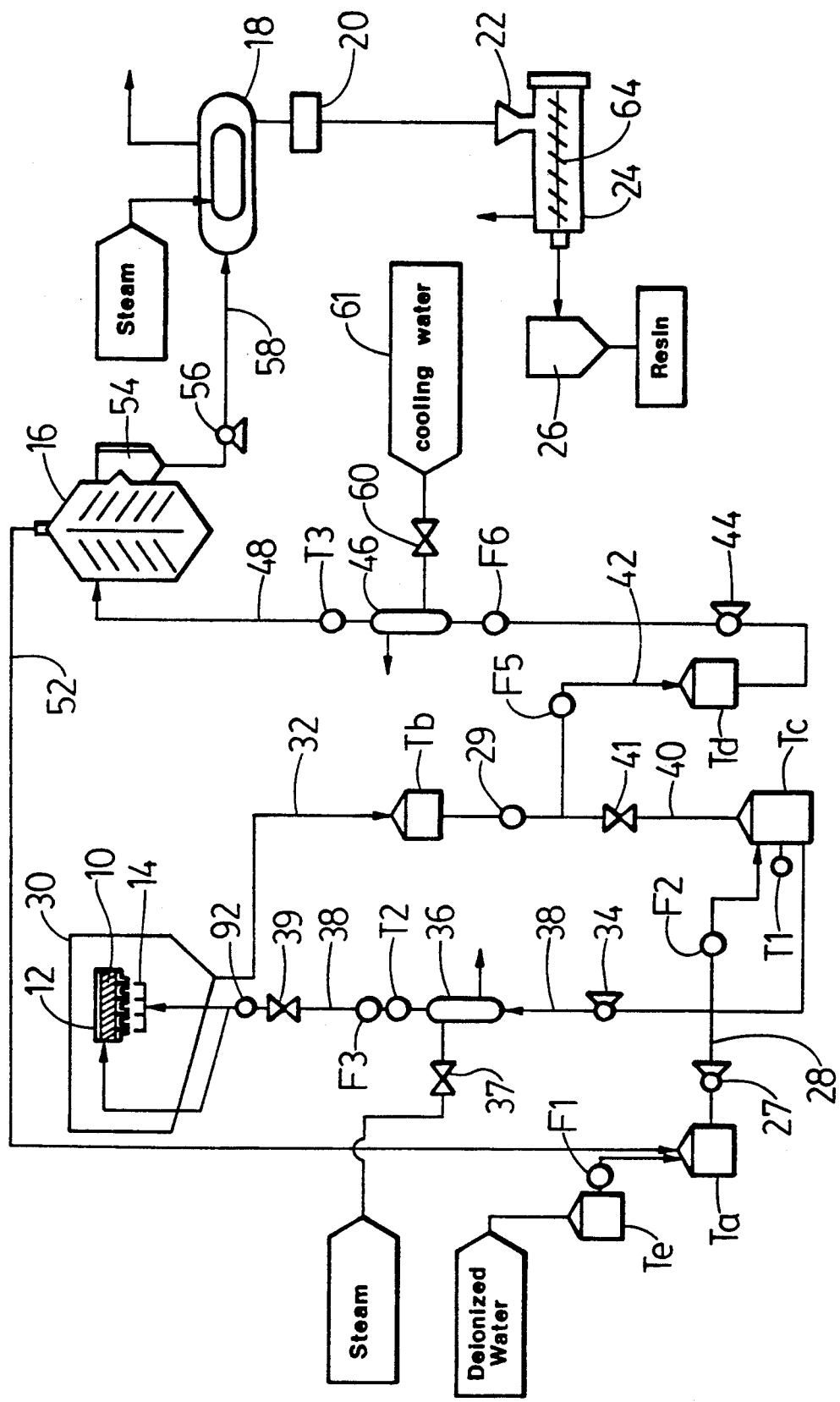
FIG._1.

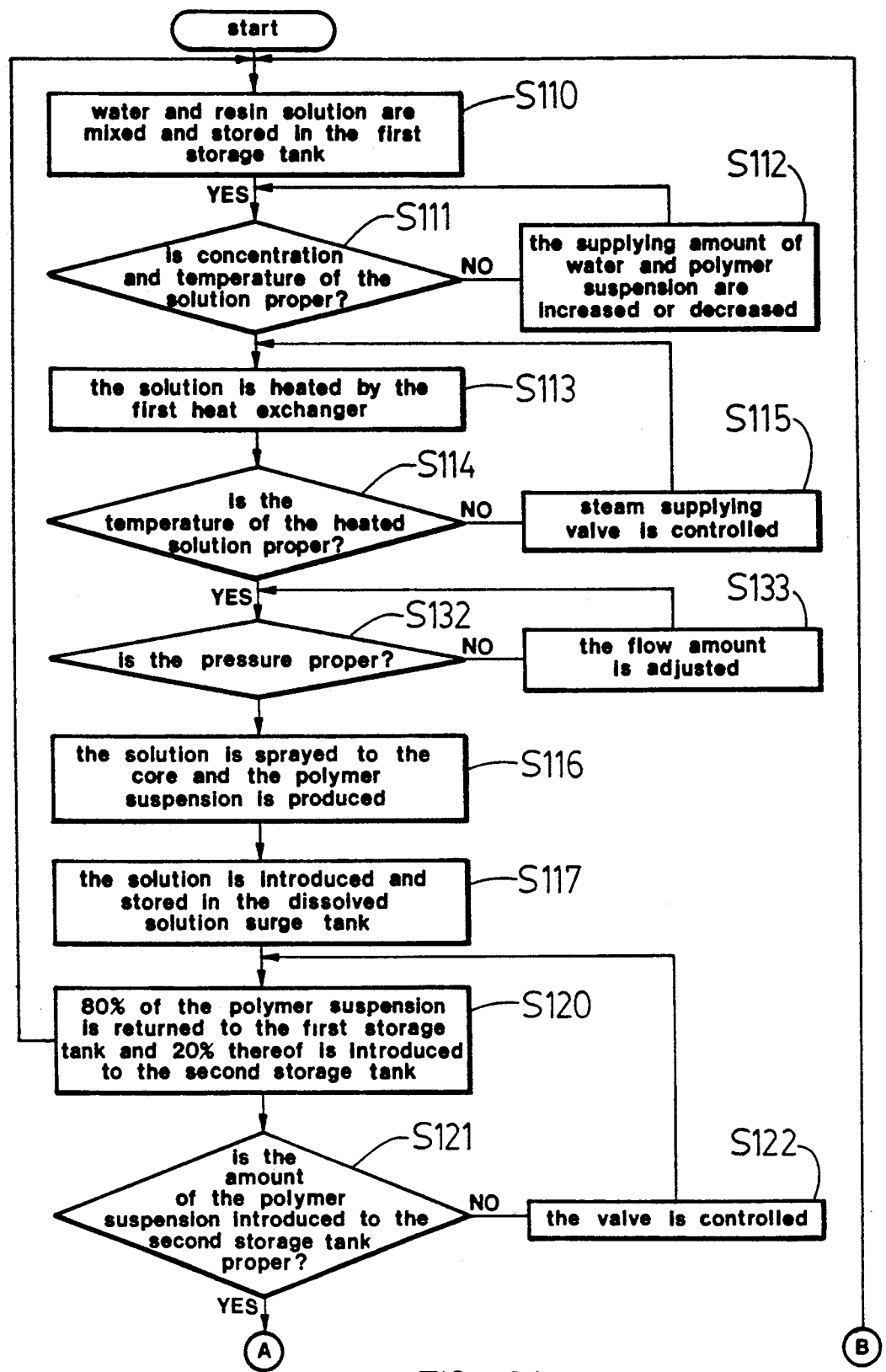
FIG._2A.

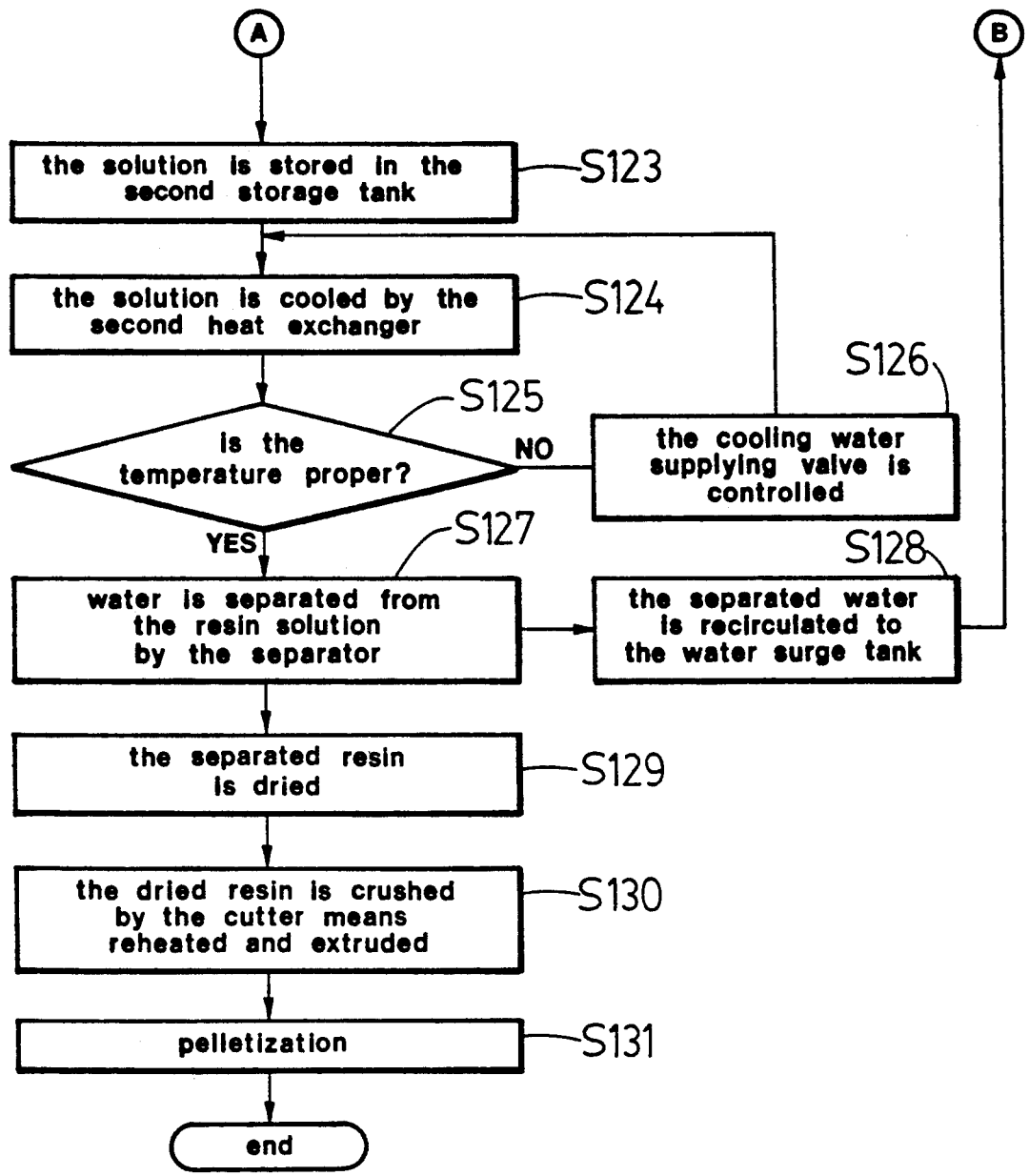
FIG._2B.

PROCESS FOR CONTINUOUSLY RECYCLING WATER SOLUABLE RESIN

FIELD OF THE INVENTION

This invention is a continuation-in-part application of U.S. Pat. Application No. 07/654,811 filed on Feb. 13, 1991, now abandoned.

The present invention relates to a process for continuously recycling water soluble resin, more particularly, to a process which dissolves solidified water soluble resin with water and which recycles the dissolved resultant product by mixing it with virgin material for reuse.

BACKGROUND OF THE INVENTION

Generally, when making an injection molded product using a synthetic resin as virgin material, if the desired injection molded product is a hollow molded product with a complicated structure, the molded product can be made by the following processing steps. Firstly, a water soluble resin is injection-molded into a core with a predetermined shape and the molded core is then positioned on a die for producing the desired product. Consequently, water insoluble resin is overmolded on the molded core that is positioned on the die. After the water insoluble resin solidifies, the water soluble resin core is sprayed with water to dissolve it. As a result, the desired hollow product made of a water insoluble synthetic resin is produced.

The above process is generally known as the "lost core technology." Typical water soluble resin used for making the core includes GBC 1330 TE (trade mark) which is available from Belland AG (Switzerland). GBC 1330 TE is a resin which is produced by mixing PAEA (polyacrylic acid-ethyl acrylate) and copolymers of acrylic acid and ethyl acrylate at a predetermined ratio and with a predetermined amount of mineral filler and, which is referred to as virgin resin. The copolymer has a hydrophilic group and, hence, the polymer chain is dissolved by water but not decomposed in water. Therefore, a polymer suspension is produced and it can be substantially recycled for reuse.

With the lost core technology, however, using the water soluble resin to injection-mold the core results in residual products, such as the polymer suspension produced during the dissolution of the core, that are discharged through the sewage system. In this case, even if the polymer suspension used is not noxious, it leads to environment contamination, particularly water pollution.

To solve the water pollution problem, a method for recycling residual resin from the polymer suspension in addition to the product molding process of the lost core technology has been proposed by Belland AG. More specifically, the proposed resin recycling method comprises either of two core dissolving steps.

Firstly, water is pumped passed and through the core that is positioned in a closed circuit. In this step, the closed circuit system is used to recirculate water having a temperature of 100° C. or more to promote the dissolution of the core.

Secondly, an opened circuit system is used to spray several part-branched high temperature water streams from an inner part thereof and to drain the water to a sump in order to recycle the residual resin. Here, the time for dissolving the core depends on the thickness of the core, the shape of system parts and the temperature of water but is preferably set to fifteen minutes, and the specific dispersion time is set to 2–5 mm/min at a water temperature of 95° C.

When the polymer suspension produced in the core dissolving process is subject to thin film evaporation, water is evaporated and the remaining resin is vacuum dried to obtain a pellet-shaped product which can be recycled by mixing with the core virgin material at an appropriate ratio.

However, with the first recycling method of Belland AG wherein water is pumped around the core in the closed circuit, although the melting temperature of resin is between 180° C. and 210° C., because the temperature of water to be used is more than 100° C., the resin can only be dissolved slightly in the water, and moreover, since the boiling point of water is 100° C., the water used to dissolve the core as well as the polymer are boiled at a temperature above 100° C. Therefore by boiling the water or polymer suspension, the composition of the polymer suspension is changed, or bubbles and foam are produced within the tank containing the polymer suspension. The result is that the pumping efficiency is lower, the time for dissolving the core is longer in accordance with the compositional change of the polymer suspension or the lowering of pumping effect, and the specific dispersion time is also longer.

On the other hand, with the second recycling method, a higher pressure of 10–15 $kg/cm^2$ is needed to spray the polymer suspension to dissolve the core. As a result, energy consumption is considerably increased and the cost of manufacturing the product is also increased.

Further, the separation of water from the polymer suspension is accomplished by a heating process wherein the polymer suspension is heated to evaporate the water component. Accordingly, the physical property of the resin is probably changed by the heat produced in the heating process, so that the physical property of the virgin resin is also changed.

SUMMARY OF THE INVENTION

Accordingly, a principle object of the present invention is to provide a process for continuously recycling water soluble resin, wherein the core is quickly dissolved to increase efficiency.

Another object of the present invention is to provide a process for continuously recycling water soluble resin, wherein the recycled resin can be mixed with virgin resin without changing the physical property thereof.

Still another object of the present invention is to provide a process for continuously recycling water soluble resin, wherein the power and cost needed for recycling the resin from the polymer suspension are significantly decreased.

In order to achieve the above objects, the present invention contemplates a process for continuously recycling water soluble resin, comprising the steps of: (1) preparing a resin solution such as polyacrylic acid and talc of about 6–12 wt(weight) % in a first storage tank and maintaining the resin solution at a temperature of 71°–77° C.; (2) heating the resin solution with a first heat exchanger using steam at a temperature of 88°–99° C. while the resin solution is discharged from the first storage tank to a dissolution device via the first heat exchanger; (3) spraying the resin solution, by spray means having a nozzle, into a dissolution device at a pressure of about 2.8–4.9 $kg/cm^2$ to dissolve the core therein to form a polymer suspension having a resin concentration of 7-13 wt %; (4) introducing the polymer suspension from the core dissolution step to a dissolved solution surge tank and then distributing about 80% of the polymer suspension to a first storage tank and the remaining polymer suspension to a second storage tank; (5) cooling the polymer suspension to a temperature of about 40°-60° C., preferably 50° C., with a second heat exchanger that uses cooling water, as the polymer suspension is introduced to a separator through the second heat exchanger that is positioned between the second storage tank and the separator; (6) separating water, which contains a resin component of 2-3 vol %, from the polymer suspension with the separator rotating at a speed of 10,000 rpm to obtain a resin product that has a resin concentration of 40-60 wt %; (7) recirculating the separated water from the separator to a water surge tank; (8) drying the product with a dryer to a temperature of about 175°-185° C. for ten minutes to form a dried resin product of 96-97.5 wt %; (9) cooling the dried resin product to a temperature of 20°-40° C. with a blower in the dryer; (10) crushing the cooled resin product by cutter means, and reheating and extruding the crushed resin product through an extruder under a temperature of 190°-210° C. to completely remove the moisture contained in the resin product; and, (11) pelletizing the resin from the extruder.

The water soluble resin used is a compound produced from a synthetic water soluble polymer and includes an inorganic filler. The synthetic water soluble polymer can be employed with comonomers thereof so as to improve thermal stability, processibility and mechanical strength properties thereof. Preferably, the concentration of the comonomer in the synthetic water soluble polymer is in the range of 3-30 wt %. According to the present invention, the synthetic water soluble polymer includes materials selected from polyacrylic acid, copolymers of acrylic acid and acrylamide, copolymers of acrylic acid and ethyl acrylate, and the like. Alternatively, the synthetic water soluble polymer may include materials selected from copolymers of acrylamide and acrylic acid salt, polymethacrylic acid, copolymers of vinyl alcohol and vinyl acetate, and the like.

Further, an inorganic reinforcing material can be added to produce a compound having improved linear thermal expansion property and compression strength in the physical properties of the synthetic water soluble polymer. The reinforcing material includes materials selected from alumina, aluminum hydroxide, silica, talc, titanium dioxide, and the like. Preferably, in the present invention, talc is employed as the reinforcing material in order to reduce the cost of the product. When the synthetic water soluble polymer and the compound are produced, the concentration of the inorganic reinforcing material is set to a range of 10-35 wt % (see Table 1).

TABLE 1

Polymers and Inorganic Fillers for Water Soluble Compound

| Base Polymer (65-90 Wt %) | Inorganic Filler (10-35 wt %) | | | | | | | | | |
|---|---|---|---|---|---|---|---|---|---|---|
| | A | AH | CC | CP | C | G | M | MH | S | T | TD |
| Polyacrylic acid | O | | O | | O | | | | O | O | O |
| Copolymers of acrylic acid and arylamide | O | | O | | O | O | O | O | O | | |
| Copolymers of acrylic acid and ethyl acrylate | O | | O | | | O | | | | O | |
| Copolymers of vinyl alcohol and vinyl acetate | O | O | | | O | | | | O | O | O |
| Copolymers of acrylamide and acrylic acid salt | O | | O | | O | O | O | O | O | | |
| Polymethacrylic acid | O | | | | O | O | | | | O | O |

(The "O" designation indicates presence of the particular reinforcing material in the filler. Note that alumina and talc are present in each example.)

A Alumina
AH Aluminum hydroxide
CC Calcium carbonate
CP Calcium phosphate
C China clay
G Glass
M Mica
MH Magnesium hydroxide
S Silica
T Talc
TD Titanium dioxide In order to achieve the process in which the water soluble core, that is completely dissolved by the resin solution, is recycled compounds having the compositions shown in Table 2 are used as core materials.

TABLE 2

Various Water Soluble Compounds for Experiments

| Exp. No. | PAA | PAAM | PAEA | PAAS | PMA | PVAL |
|---|---|---|---|---|---|---|
| Ex-1 | T | | | | | |
| Ex-2 | A | | | | | |
| Ex-3 | | T | | | | |
| Ex-4 | | A | | | | |
| Ex-5 | | | T | | | |
| Ex-6 | | | A | | | |
| Ex-7 | | | | T | | |
| Ex-8 | | | | A | | |
| Ex-9 | | | | | T | |
| Ex-10 | | | | | A | |
| Ex-11 | | | | | | T |
| Ex-12 | | | | | | A |

PAA Polyacrylic acid
PAAM Copolymers of acrylic acid and acrylamide
PAEA Copolymers of acrylic acid and ethyl acrylate
PAAS Copolymers of acrylamide and acrylic acid
PMA Polymethacrylic acid
PVAL Copolymers of vinyl alcohol and vinyl acetate
A Alumina
T Talc Considering the optimum dissolving time of the core made of the compounds shown in Table 2, it was necessary to vary the process in order to determine the optimum range of the resin concentration of the spray solution required for the dissolution of the core. For this reason, the core dissolving time of various water soluble compounds has been measured according to the resin concentration of the spray solution.

Table 3 shows the experimental data. The experiment was carried out under the following conditions: pressure of 3 kg/cm², temperature of 95° C., and resin spraying by exterior spraying which forms turbulent flow. According to the exterior spray method, water is sprayed from a tip end of the core toward the inside thereof.

Alternatively, using an interior spray method, water is sprayed through a plurality of spray orifices of a nozzle that is inserted into the core.

TABLE 3

Examples for Experimental Results to Measure Dissolving Time of Various Water Soluble Compounds

| Resin amount (wt %) | Time required to completely dissolve the core (minutes) No. of Experiment | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 15.0 | 15.5 | 14.8 | 15.2 | 16.0 | 16.8 | 14.4 | 19.2 | 17.0 | 25.0 | 17.2 | 28.0 |
| 2 | 14.0 | 14.1 | 13.2 | 13.8 | 14.0 | 15.0 | 13.1 | 17.1 | 15.2 | 23.0 | 25.8 | 25.0 |
| 4 | 12.0 | 12.7 | 11.5 | 11.7 | 13.0 | 15.0 | 11.2 | 15.8 | 13.6 | 20.5 | 14.1 | 23.0 |
| 6 | 9.0 | 9.4 | 8.5 | 8.8 | 10.0 | 11.5 | 8.7 | 12.2 | 12.1 | 17.2 | 12.3 | 18.0 |
| 8 | 8.0 | 8.4 | 8.2 | 8.5 | 9.0 | 10.1 | 7.9 | 10.1 | 10.8 | 16.3 | 11.3 | 16.5 |
| 10 | 8.0 | 8.5 | 7.9 | 8.1 | 8.0 | 8.7 | 7.7 | 10.5 | 12.2 | 14.8 | 12.7 | 18.2 |
| 12 | 9.0 | 9.7 | 8.3 | 8.3 | 10.0 | 10.8 | 8.0 | 11.8 | 14.3 | 16.3 | 13.8 | 21.5 |
| 14 | 12.0 | 12.4 | 10.0 | 10.6 | 13.0 | 13.8 | 10.5 | 14.3 | 17.7 | 18.2 | 17.9 | 25.2 |
| 16 | 14.0 | 14.6 | 12.1 | 12.5 | 15.0 | 15.9 | 11.7 | 16.7 | 19.2 | 21.0 | 19.5 | 27.1 |
| 18 | 16.0 | 16.2 | 14.8 | 14.9 | 17.0 | 18.0 | 13.8 | 19.2 | 21.1 | 23.5 | 21.1 | 29.2 |
| 20 | 17.0 | 17.3 | 15.6 | 15.2 | 18.0 | 21.0 | 15.2 | 20.5 | 22.3 | 24.5 | 23.5 | 30.5 | where,

1. Resin amount (weight %): weight percentage of water soluble compounds in the solution to be sprayed to the water soluble compound solid,
2. Test conditions: 3 kg/cm², 95° C., exterior spray method, and turbulent flow.

As is apparent from Table 3, the shortest dissolving time is achieved when the resin concentration of the spray solution is set to 6–12 wt %.

Table 4 contains data obtained by measuring the dissolution time of cores made of polyacrylic acid and talc, using resin solutions of different concentrations that were sprayed at the core and under different pressure and spray conditions.

TABLE 4

| Resin concentration of resin solution to be sprayed (wt %) | Time required to completely dissolve the core (minutes) | | | |
|---|---|---|---|---|
| | Ex. 1 | Ex. 2 | Ex. 3 | Ex. 4 |
| 0 | 25 | 21 | 17 | 16 |
| 2 | 23 | 19 | 15 | 14 |
| 4 | 20 | 16 | 13 | 13 |
| 6 | 16 | 12 | 12 | 10 |
| 8 | 10 | 10 | 10 | 9 |
| 10 | 11 | 9 | 12 | 8 |
| 12 | 13 | 10 | 14 | 10 |
| 14 | 17 | 11 | 17 | 13 |
| 16 | 19 | 14 | 19 | 15 |
| 18 | 20 | 17 | 21 | 17 |

Example 1: 10 kg/cm², 95° C., interior spray type.
Example 2: 15 kg/cm², 95° C., interior spray type.
Example 3: 2 kg/cm², 95° C., exterior spray type, linear flow.
Example 4: 3 kg/cm², 95° C., exterior spray type, turbulent flow.

As is apparent from Table 4, the dissolution effect of the exterior spray type is superior to that of the interior spray. Further, according to the present invention, the resin concentration of the spray solution providing the optimum dissolving time obtained, when using the exterior spray type dissolution device, is in the range of 6–12 wt %.

From Tables 3 and 4, when a solution having a resin concentration of 6–12 wt % is sprayed by the exterior spray type in the form of turbulent flow to dissolve the water soluble resin core, the optimum dissolution time is obtained regardless of the kinds of compounds used as shown in Table 2.

Accordingly, the resin concentration of the spray solution employed in the present invention is in the range of 6–12 wt % and the spray process is executed by exterior spray in the form of turbulent flow.

The above and other objects, features, and advantages of the invention will be apparent from the following description taken with reference to the accompanying drawings.

BRIEF DESCRIPTION OF THE DRAWINGS

FIG. 1 is a schematic piping diagram of a system for continuously recycling water soluble resin according to the present invention; and, FIGS. 2A and 2B are flow charts illustrating a process for continuously recycling water soluble resin according to the present invention.

DETAILED DESCRIPTION OF THE INVENTION

Now, a preferred embodiment of the present invention will be described in detail.

FIG. 1 is a schematic piping diagram of a system for continuously recycling water soluble resin according to the present invention.

In order to prepare a resin solution to be used in the present invention, first storage tank Tc stores both (1) water that is supplied from water surge tank Ta and (2) polymer suspension having a temperature of 88°–99° C. that comprises polyacrylic acid and talc, copolymers of acrylic acid and acrylamide and talc, copolymers of acrylic acid and ethyl acrylate and talc, and the like, that is supplied from dissolved solution surge tank Tb.

Deionized water is supplied to the water surge tank Ta from deionized water tank Te. Water separated by separator 16 is also supplied through line 52 to the water surge tank Ta. The amount of deionized water supplied from the deionized water tank Te can be controlled by flow meter F1. The volume resistance of the deionized water used in the present invention is 18 m$\phi$ or more, and the water separated by the separator 16 contains a resin component of 2–3 vol %.

The amount of water introduced from the water surge tank Ta depends on the amount of polymer suspension, having a resin concentration between 7–13 wt %, that is supplied from the dissolved solution surge tank Tb. The amount of water introduced is measured by flow meter F2 to thereby control the amount of water pumped by pump 27, so that the resin solution concentration in the first storage tank Tc is constantly maintained. At this time, the resin concentration of the solution in the first storage tank Tc is preferably in a range of 6–12 wt % and the temperature of the solution in the first storage tank Tc is sensed by temperature sensor T1, and the temperature is controlled by using a hot water jacket (not shown) operated in accordance with a sensed signal, which is attached to the first storage tank Tc, so that the temperature of the solution is set to a range of 71°–77° C.

The resin solution stored in the first storage tank Tc is supplied by pump 34 to first heat exchanger 36 and the temperature of the resin is increased, by the first heat exchanger 36 using steam externally supplied thereto up to 88°–99° C. The amount of the resin solution discharged from the first heat exchanger 36 is measured by flow meter F3.

Thus, the amount of the resin solution which is introduced from the first storage tank Tc to the first heat exchanger 36 can be controlled by pump 34 in accordance with the measured signal from flow meter F3.

Furthermore, temperature sensor T2 senses the temperature of the solution discharged from the first heat exchanger 36 to open or close valve 37, so that valve 37 is closed to reduce the amount of steam when the temperature of the solution is higher than a predetermined temperature while valve 37 is opened to increase the amount of steam when the temperature of the solution is lower than a predetermined temperature, to thereby control the temperature of the solution discharged from the first heat exchanger 36.

A process for dissolving the core that is made of the same material as the resin contained in the solution, that is, the core made of water soluble resin such as polyacrylic acid and talc, copolymers of acrylic acid and acrylamide and talc, copolymers of acrylic acid and ethyl acrylate and talc, and the like, is executed in the dissolution device 30.

The solution having a resin concentration of 6–12 wt %, discharged from the first heat exchanger 36, is supplied through line 38 to spray device 14, such as a nozzle, which is positioned at the end of line 38. The spray device is extended into dissolution device 30, while constantly maintaining the amount of flow and temperature of 88°–99° C. established by the flow meter T3 and the temperature sensor T2. The injection molded product 12 is disposed in dissolution device 30 and has a core 10 formed therein. The solution is sprayed toward the tip end of core 10 through spray device 14.

On line 38 is pressure sensor 92 that is arranged to sense the pressure of the resin solution introduced to the spray device 14 from the first heat exchanger 36. Consequently, valve 39 is controlled in accordance with the sensed signal from pressure sensor 92 to constantly maintain the pressure of the solution sprayed from spray device 14. At this time, the pressure of the solution sprayed is 2.8–4.9 kg/cm and the solution flow is turbulent. Spray device 14 is an exterior spray type for dissolving core 10 by spraying the resin solution on the outer side of core 10 and has a specific dispersion time of 0.2–0.5 min/mm, which can be changed on the basis of the shape and thickness of the core.

The polymer suspension from the resin solution, which dissolved core 10, is introduced to the dissolved solution surge tank Tb from the dissolution device 30 along line 32.

The polymer suspension thus introduced is stored in tank Tb for a given time to maintain a constant resin concentration of 7–13 wt % during the change of the injection molded product 12. At this time, the pumping operation for supplying the solution from the first storage tank Tc to the dissolution device 30 is stopped. The resin concentration is checked depending upon the water level of the solution in tank Tb.

The pumping operation is restarted immediately after the change of injection molded product 12 under conditions to insure that the solution reaches a proper water level in tank Tb. Hence, the concentration of polymer suspension stored in the dissolved solution surge tank Tb for a given time is constantly maintained.

Then, 80% of the polymer suspension is returned to first storage tank Tc while 20% of the polymer suspension is introduced to second storage tank Td. The polymer suspension returned to first storage tank Tc is mixed with deionized water to maintain a predetermined resin concentration and then is reused in the dissolution process.

The amount of polymer suspension introduced into first and second storage tanks Tc and Td from the dissolved solution surge tank Tb is controlled by flow meter F5 and valve 41. More specifically, flow meter F5 measures the amount of polymer suspension introduced into second storage tank Td to control valve 41 in such a way that when the amount of the polymer suspension introduced is high, valve 41 is further opened; whereas, when the amount of the polymer suspension is low, valve 41 is further closed.

The polymer suspension introduced into second storage tank Td is cooled by second heat exchanger 36 and then separated by separator 16 which can be a continuous centrifugal separator.

The separating operation of the separator 16 is continuous during the change of the injection molded product 12.

The polymer suspension in second storage tank Td is introduced into separator 16 through second heat exchanger 46 along line 48 by pump 44.

In this case, the amount of polymer suspension introduced into second heat exchanger 46 is measured by flow meter F6 and valve 44 is controlled by the measured signal from flow meter F6 to adjust the amount of polymer suspension that is introduced into second heat exchanger 46.

Thereinafter, the polymer suspension is cooled to a temperature of about 40°–60° C., preferably 50° C., by second heat exchanger 46 using cool water. The temperature of the cooled polymer suspension is detected by temperature sensor T3. That is, sensor T3 detects the temperature of the polymer suspension that is discharged from the second heat exchanger 46 in order to control valve 60 that is positioned between cooling water tank 61 and second heat exchanger 46 so that the temperature of the polymer suspension introduced to separator 16 from second heat exchanger 46 is constantly retained.

The polymer suspension that is cooled by second heat exchanger 46 to a temperature of 40°–60° C. is separated into water and resin by separator 16. At this time, the rotating speed of separator 16 is 10,000 rpm, and the separated water contains resin components of 2–3 vol. %, which is recirculated to the water surge tank Ta along line 52 for reuse.

The resin, which is separated from water and concentrated and which has a resin concentration of 40–60 wt %, is collected in collecting chamber 54 and is then introduced through pump 56 into dryer 18 that can be a band dryer which uses steam. Thus the resin is dried at a temperature of 175°-185° C. for approximately ten minutes in a non-vacuum state so that it contains less than 3 wt % moisture. When the resin is dried at a temperature below 175° C., the amount of moisture remaining is greater than 5 wt %. Alternatively, when the resin is dried above 185° C., the color of the resin may be changed and the physical property of the resin may deteriorate.

The resin material dried by dryer 18 is cooled by a blower (not shown) in dryer 18 to a temperature of 20°-40° C. and is then crushed by cutter means 20.

The crushed resin material is supplied to extruder 24 through hopper 22. Consequently, the resin supplied to extruder 24 is reheated by an electric or oil heating/cooling device (not shown) to a temperature of about 190°-210° C., and then the moisture contained in the resin is vacuum-removed through one or two vacuum ports of extruder 24 to completely remove the moisture contained in the resin. This extruder 24 has one or two screws 64. The resin extruded by extruder 24 is then supplied to pelletizer 26 which pelletizes it by first mixing it with enough virgin resin so that the virgin resin comprises 10 wt % thereof (that is, the ratio of the resin to virgin resin is 9:1).

Now, a process for recycling the water soluble resin executed in the system thus constructed will be described with reference to the flow charts shown in FIGS. 2A and 2B.

Firstly, in step S110 for storing the water and resin polymer suspension in first storage tank Tc, the water and polymer suspension are supplied from water surge tank Ta and dissolved solution surge tank Tb to first storage tank Tc. Then, the temperature of the solution is sensed by the temperature sensor T1 that is disposed in first storage tank Tc and the amount of the solution to be introduced into first storage tank Tc is adjusted based on the measurement of flow meter F2 to control the concentration of the solution (S111). At this time, if the temperature and concentration of the solution are proper, pump 27 and valve 41 are controlled by signals from temperature sensor Tc and flow meter F2 to increase or decrease the amount of water or polymer suspension (S112).

Meanwhile, if the temperature and concentration of the solution in first storage tank Tc are proper, then the temperature of the solution is further increased by first heat exchanger 36 and the temperature of the solution discharged from first heat exchanger 36 is sensed by the temperature sensor (S114). If the measured temperature of the solution is improper, then valve 37 is activated to control the supply of steam (S115). In addition, the pressure of the solution which is introduced to spray device 14 from first heat exchanger 36 is measured by pressure sensor P2 to control the pressure of the solution sprayed from spray device 14 to core 10 (S132). By using the measured signal to control valve 39 and depending upon the opened and closed range of valve 39, the flow of solution can be regulated constantly to adjust the solution spray pressure (S133).

The core is dissolved by the solution, having the constant temperature and pressure, to produce the polymer suspension which is introduced and stored in the dissolved solution surge tank Tb (S116 and S117). Consequently, 80% of the polymer suspension in dissolved solution surge tank Tb is returned to first storage tank Tc while 20% of the polymer suspension is introduced to second storage tank Td which is measured by flow meter F5 (S121).

Thus, valve 41 is controlled by the signal from flow meter F5 so as to constantly maintain the amount of polymer suspension to be introduced to second storage tank Td (S122 and S123).

The polymer suspension in second storage tank Td is cooled by second heat exchanger 46 to a predetermined temperature (S124) and then the temperature of the cooled polymer suspension is measured by the temperature sensor T3 which is positioned at the outlet side of second heat exchanger 46 (S125). Using the temperature signal, valve 60 is controlled to adjust the amount of the cooling water that is supplied to second heat exchanger 46 (S126). Further, the properly cooled polymer suspension is separated by separator 16 into water and resin components contained therein (S127), and the separated water is recycled to water surge tank Ta while the resin is dried in dryer 18 to a resin concentration of about 97 wt % (S129). The dried resin is ground through cutter means 20 and extruder 24 and then reheated to remove all of the water (S130). The resin is then mixed with virgin material to form a mixture wherein the virgin material is 10 wt % thereof, and is pelletized in the pelletizer 26 (S130 and S131).

Althouqh the present invention has been described with reference to the process for recycling the water soluble resin using certain kinds of resin solutions, various modifications and changes can be made therein without departing from the spirit or scope of the invention.

As described above, the process for recycling the water soluble resin of the present invention reduces the core dissolving time which considerably improves the efficiency of recycling the resin. In addition, the recycling process is executed without changes in the physical property of the resin, so the recycled resin can be mixed with virgin resin for reuse.

Also, the energy required for recycling the resin is reduced so that the cost of the product is also reduced considerably.

What is claimed is:

1. A process for continuously recycling water soluble resin, comprising the steps of:
    preparing a resin solution comprising about 6–12 percent by weight of polyacrylic acid;
    heating the resin solution to a temperature of about 88° C. to 99° C.;
    spraying the heated resin solution at a pressure of about 2.8 to 4.9 kg/cm$^2$ onto a core made of resin comprising polyacrylic acid to dissolve said core to form a polymer suspension;
    directing a first portion of the polymer suspension to a separator to remove water therefrom to from a resin product concentrate; and
    recirculating a second portion of the polymer suspension for reuse in preparing the resin solution.

2. A process for continuously recycling water soluble resin, comprising the steps of:
    preparing a resin solution comprising about 6–12 percent by weight of copolymers of acrylic acid and acrylamide;
    heating the resin solution to a temperature of about 88° C. to 99° C.;
    spraying the heated resin solution at a pressure of about 2.8 to 4.9 kg/cm$^2$ onto a core made of resin comprising copolymers of acrylic acid and acrylamide to dissolve said core to form a polymer suspension;

directing a first portion of the polymer suspension to a separator to remove water therefrom to from a resin product concentrate; and recirculating a second portion of the polymer suspension for reuse in preparing the resin solution.

3. A process for continuously recycling water soluble resin, comprising the steps of:

preparing a resin solution comprising about 6–12 percent by weight of copolymers of acrylic acid and ethyl acrylate;

heating the resin solution to a temperature of about 88° C. to 99° C.;

spraying the heated resin solution at a pressure of about 2.8 to 4.9 kg/cm$^2$ onto a core made of resin comprising copolymers of acrylic acid and ethyl acrylate to dissolve said core to form a polymer suspension;

directing a first portion of the polymer suspension to a separator to remove water therefrom to from a resin product concentrate; and recirculating a second portion of the polymer suspension for reuse in preparing the resin solution.

4. A process for continuously recycling water soluble resin, comprising the steps of:

preparing a resin solution comprising about 6–12 percent by weight of one or more polymers selected from the group consisting of copolymers of acrylic acid salt and ethyl acrylate, polymethyacrylic acid, and copolymers of vinyl alcohol and vinyl acetate;

heating the resin solution to a temperature of about 88° C. to 99° C.;

spraying the heated resin solution at a pressure of about 2.8 to 4.9 kg/cm$^2$ onto a core to dissolve said core to form a polymer suspension wherein the core is made of the same polymers that form the resin solution;

directing a first portion of the polymer suspension to a separator to remove water therefrom to from a resin product concentrate; and recirculating a second portion of the polymer suspension for reuse in preparing the resin solution.

5. The process as defined in either claim 1, 2, 3, or 4 wherein the resin solution contains talc and the core also contains talc.

6. The process as defined in either claim 1, 2, 3, or 4 wherein the step of spraying the resin solution comprises of spraying the resin solution through a nozzle.

7. The process as defined in claim 6 further comprising the step of drying and heating the resin product concentrate to further remove moisture therefrom to form a product comprising about 96 to 97.5 percent resin by weight.

8. The process as defined in claim 7 wherein the polymer suspension comprises about 7 to 13 percent resin by weight wherein the step of directing a first portion of the polymer suspension to the separator comprises of directing approximately 20 percent of the polymer suspension into the separator.

9. The process as defined in claim 8 wherein the resin solution contains a filler material and the core contains a filler material.

* * * * *

UNITED STATES PATENT AND TRADEMARK OFFICE
CERTIFICATE OF CORRECTION

PATENT NO. : 5,290,493
DATED : MARCH 1, 1994
INVENTOR(S) : James Mauro

It is certified that error appears in the above-indentified patent and that said Letters Patent is hereby corrected as shown below:

On the title page, item (54): in the title "soluable" should read --soluble--.

Column 1, line 2, "soluable" should read --soluble--.

Signed and Sealed this

Thirtieth Day of August, 1994

Attest:

BRUCE LEHMAN

*Attesting Officer*              *Commissioner of Patents and Trademarks*